US009144031B2

(12) United States Patent
Almeida et al.

(10) Patent No.: US 9,144,031 B2
(45) Date of Patent: Sep. 22, 2015

(54) MAXIMUM TRANSMISSION POWER IN WHITE SPACES

(75) Inventors: Erika Portela Lopes De Almeida, Manaus (BR); Fabiano de Sousa Chaves, Manaus (BR); Robson Domingos Vieira, Brasília (BR)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 14/344,053

(22) PCT Filed: Sep. 15, 2011

(86) PCT No.: PCT/IB2011/054043
§ 371 (c)(1),
(2), (4) Date: Mar. 10, 2014

(87) PCT Pub. No.: WO2013/038234
PCT Pub. Date: Mar. 21, 2013

(65) Prior Publication Data
US 2014/0228065 A1  Aug. 14, 2014

(51) Int. Cl.
| *H04B 7/00* | (2006.01) |
| *H04W 52/24* | (2009.01) |
| *H04W 52/36* | (2009.01) |
| *H04W 16/14* | (2009.01) |
| *H04W 72/04* | (2009.01) |
| *H04W 52/28* | (2009.01) |
| *H04W 52/34* | (2009.01) |

(52) U.S. Cl.
CPC ............ *H04W 52/241* (2013.01); *H04W 16/14* (2013.01); *H04W 52/243* (2013.01); *H04W 52/283* (2013.01); *H04W 52/343* (2013.01); *H04W 52/367* (2013.01); *H04W 72/0473* (2013.01)

(58) Field of Classification Search
USPC ............... 455/522, 67.11, 68–70, 115.3, 126, 455/127.1, 127.2, 135, 226.3, 277.2, 296; 370/318
See application file for complete search history.

(56) References Cited

U.S. PATENT DOCUMENTS

| 8,526,974 B2 * | 9/2013 | Olsson et al. ............... 455/456.5 |
| 2009/0061779 A1 | 3/2009 | Gurney et al. |
| 2010/0046440 A1 | 2/2010 | Singh |
| 2010/0048234 A1 * | 2/2010 | Singh ............................ 455/509 |

(Continued)

OTHER PUBLICATIONS

"Second Report and Order and Memorandum Opinion and Order", Federal Communications Commission, FCC 08-260, Nov. 14, 2008, pp. 1-130.

(Continued)

*Primary Examiner* — Dominic E Rego
(74) *Attorney, Agent, or Firm* — Nokia Technologies Oy

(57) ABSTRACT

In accordance with the example embodiments of the invention there is at least a method, apparatus, and executable computer program to receive a location of a white space device, determine an original probability with which a primary receiver would operate correctly at the location, wherein the original probability is determined without taking interference due to the white space device into account, determine a maximum degradation to the original probability that the white space device may cause at the location, wherein the maximum degradation is based at least in part on an estimated signal quality of a primary system at the location, and determine a maximum transmission power for the white space device based on the maximum degradation.

19 Claims, 5 Drawing Sheets

(56) References Cited

U.S. PATENT DOCUMENTS

2010/0330919 A1   12/2010  Gurney et al.
2011/0090887 A1*  4/2011  Kim et al. .................... 370/338
2011/0250908 A1* 10/2011  Olsson et al. ............. 455/456.5
2013/0090071 A1*  4/2013  Abraham et al. ............... 455/73

OTHER PUBLICATIONS

"Maximum EIRP Calculation Method", Electronic Communications Committee, INdT1, SE43(11)33, 10th meeting of SE43, Jul. 5-7, 2011, 18 pages.

International Search Report and Written Report received for corresponding Patent Cooperation Treaty Application No. PCT/IB2011/054043, dated Jun. 5, 2012, 14 pages.

"ECC report 159: Technical and operational requirements for the possible operation of cognitive radio systems in the 'white spaces' of the frequency band 470-790 Mhz", Feb. 3, 2011, retrieved from the internet: <URL:http://www.erodocdb.dk/doks/filedownload.aspx?fileid=3708&fileurl=http://www.erodocdb.dk/Docs/doc98/official/pdf/ECCREP159.pdf>.

Extended European Search Report received for corresponding European Patent Application No. 11872485.5, dated Mar. 19, 2015, 7 pages.

Lee et al., "Area Spectrum Efficiency of TV White Space Wireless System With Transmit Power Control", The 12th International Conference on Advanced Communication Technology, vol. 2, Feb. 7-10, 2010, pp. 1061-1066.

* cited by examiner

MAXIMUM TRANSMISSION POWER IN WHITE SPACES

RELATED APPLICATION

This application was originally filed as PCT Application No. PCT/IB2011/054043 filed Sep. 15, 2011.

TECHNICAL FIELD

The teachings in accordance with the example embodiments of this invention relate generally to a secondary basis use of a spectrum.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The continuous growth of wireless communication systems and the demand for additional bandwidth has provided motivation for a redefinition of frequency spectrum usage such that the spectrum can be used in a more efficient way. Previously, the spectrum has been allocated in a fixed manner, (i.e., it is allocated according to a particular service and technology). However, this fixed allocation is seen to lead to a waste of this finite resource for at least the reason that portions of the spectrum will inherently remain unused. These unused portions of the frequency spectrum herein referred to as white spaces. There exists a need for a more efficient way to allocate the spectrum such that there is less waste of the spectrum.

SUMMARY

In accordance with an example aspect of the invention, there is a method comprising receiving a location of a white space device, determining an original probability with which a primary receiver would operate correctly at the location, wherein the original probability is determined without taking interference due to the white space device into account, determining a maximum degradation—to the original probability—that the white space device may cause at the location, wherein the maximum degradation is based at least in part on an estimated signal quality of a primary system at the location, and determining a maximum transmission power for the white space device based on the maximum degradation.

In accordance with an example aspect of the invention, there is an apparatus comprising at least one processor, and at least one memory including computer program code, where the at least one memory and the computer program code are configured, with the at least one processor, to cause the apparatus to at least receive a location of a white space device, determine an original probability with which a primary receiver would operate correctly at the location, wherein the original probability is determined without taking interference due to the white space device into account, determine a maximum degradation to the original probability that the white space device may cause at the location, wherein the maximum degradation is based at least in part on an estimated signal quality of a primary system at the location, and determine a maximum transmission power for the white space device based on the maximum degradation.

In accordance with another example aspect of the invention, there is an apparatus comprising means for receiving a location of a white space device, means for determining an original probability with which a primary receiver would operate correctly at the location, wherein the original probability is determined without taking interference due to the white space device into account, means for determining a maximum degradation to the original probability that the white space device may cause at the location, wherein the maximum degradation is based at least in part on an estimated signal quality of a primary system at the location, and means for determining a maximum transmission power for the white space device based on the maximum degradation.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

Figure 1:
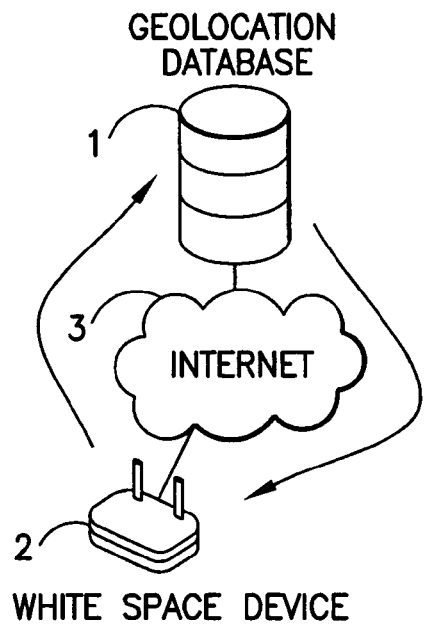
FIG. 1 shows communication between a database and a white space device.

As indicated above, there exists a need to more efficiently utilize the frequency spectrum. One solution in accordance with the example embodiments of the invention includes a method for an efficient use of white spaces of the spectrum by secondary systems and/or users.

Certain abbreviations that may be found in the description and/or in the Figures are herewith defined as follows:
CEPT European Conference of Postal and Telecommunications Administrations
DTT digital terrestrial television
EIRP effective isotropic radiated power
FCC Federal Communications Commission
PSTN publicly switched telephone network
TDOA time difference of arrival
TV television
UHF ultra high frequency
VHF very high frequency
WSD white space device
WSD EIRP white space device effective isotropic radiated power The example embodiments of the invention relate to a novel method for a secondary basis use of white spaces of the spectrum. More particularly, the example embodiments of the invention provide a method which uses a geolocation database to determine proper channels of white spaces which can be used for secondary basis systems and/or users without causing interference to primary systems which are using the spectrum.

A primary system is considered a system for which one or more channels of the frequency spectrum has been licensed and/or assigned. Parts of the frequency spectrum which are not assigned and/or used by primary system(s) may be referred to as white spaces. A white space may be free for secondary usage locally and/or temporarily, as the primary systems and/or users may not be using the white space. Secondary systems and/or users may use a white space channel if the channel is detected as being free from use by another system, such as a primary system. This detecting can include sensing and/or receiving information from a database, such as a so called primary database. Examples of primary systems include systems for radio and television broadcasting, cellular telephony, maritime radio, police, fire, and public safety radio, GPS, radio astronomy, and earth stations for satellite communications to name only a few. Such secondary systems and/or users that can benefit from the unused space include systems and/or users related to wireless regional area network broadband access, such as for rural areas, wireless local area networks (e.g., IEEE 802.11), and wireless personal area networks, such as the industrial, scientific, and medical (ISM) band networks, to name only a few.

The example embodiments of the invention provide at least a method for a secondary basis use of white spaces of the spectrum which may be licensed to at least any of the primary systems as described above. Assigning any secondary communication to a white space is challenging for at least the reason that it must be ensured that any interference due to a white space device (WSD) of a secondary system does not interfere with a primary service, such as those described above, using another frequency/channel of the spectrum.

For example, in order to avoid harmful interference to a primary system, it is advantageous to define a maximum transmission power for WSDs whose operations in a white space channel can interfere with a primary system. WSD transmission power can be defined according to a criteria affording interference protection to the primary service. This criterion takes into account limitations of receivers in dealing with interference, as well as location aspects which relate to signal quality of the primary service. The example embodiments of the invention take into account that efficient usage of white spaces depends on the flexibility of WSD transmission power limits with respect to a specific location of a WSD.

Regarding one such primary system, it is noted that the deployment of digital terrestrial television (DTT) represented an evolution from analogue terrestrial television in various aspects, providing improved image quality and a reduced use of the spectrum. This latter advantage of DTT provides motivation for a secondary basis use of parts of the spectrum defined for DTT broadcasting which are not used. These unused parts of the DTT spectrum can be referred to as TV white spaces.

In DTT service assignment planning, for example, the criterion used to measure the quality of the received signal in a given area is location probability, which is defined as the probability that a DTT receiver would operate correctly at a specific location. Other data related to the protection of the DTT service is overload threshold data, or a threshold level of interference at a DTT receiver. Interference above this threshold can cause a DTT receiver to lose its ability to discriminate between wanted DTT signals and interference signals. Thus, for a secondary use of a TV white space at least some interference protection limits must be respected in order to control degradation to the quality of the primary DTT service.

This is true for a secondary use of any type of white space in the spectrum, not just TV white spaces. For example, such criterion can apply for a use of a white space by secondary system such as a system related to wireless regional area network broadband access for rural areas, wireless local area networks (e.g., IEEE 802.11), and wireless personal area networks, such as the industrial, scientific, and/or medical (ISM) band networks, as identified above.

Besides the determination of available channels in each location, in accordance with an example embodiment of the invention, there is provided at least a method to use a database to define a maximum permitted isotropic radiated power (EIRP), for communicating over WSDs, which is based on the levels of allowed interference to primary systems. The defined EIRP provides an advantage at least in that it allows for improved flexibility in determining WSD maximum transmission power limits with respect to a specific location of a WSD. Previously, a problem of defining maximum permitted effective transmission power limits for WSDs was addressed by two different approaches: a fixed approach and a location based approach.

Both the fixed approach and the location based approach use spectrum sensing and/or a geolocation database. A geolocation database can provide information related to positioning and can, in addition to a set of geographic coordinates, provide information regarding a particular location, for example a street address. The geolocation database can use data from advanced RF location systems. Utilizing, for example, Time Difference Of Arrival (TDOA) where greater specificity of location is possible. TDOA systems often utilize mapping displays or some other geographic information system. Further, geolocation data can include information regarding country, region, city, postal/zip code, latitude, longitude and time zone.

Further, the CEPT and the FCC have presented operations for the possible use of TV white spaces for other communication. In this regard, for the FCC operations the reader is directed to [1] "FCC 08-260 Second Report and order and memorandum opinion and order, November 2008," and for the CEPT operations the reader is directed to [2] "Draft ECC Report 159: Technical and Operational Requirements for the Possible Operation of Cognitive Radio Systems in the White Spaces of the Frequency Band 470-790 MHz, January 2010."

In addition, the FCC and CEPT, as mentioned above, have implemented standards which must be followed if a TV white space is to be utilized on a secondary basis. For example, the FCC has implemented a standard that sets a fixed maximum power for white space devices, whereas the CEPT is discussing a similar standard but considers the degradation in the primary system in each location.

The fixed approach, adopted by the FCC [1] in the United States, sets maximum transmission power limits and minimum separation distances from a DTT coverage area. According to FCC 08-260:

"In this Second Report and Order, we adopt rules to allow unlicensed radio transmitters to operate in the broadcast television spectrum at locations where that spectrum is not being used by licensed services (this unused TV spectrum is often termed "white spaces") [and] "We are providing for both fixed and personal/portable devices to operate in the TV white spaces on an unlicensed basis," (section I (1) of FCC 08-260).

Here, a quality of the primary service coverage is apparently not considered. The maximum transmission power limit is set according to specific WSD characteristics, such as in consideration of a classification of a device, for example a classification as portable or fixed device. It is noted that according to the FCC:

"All devices, except personal/portable devices operating in client mode, must include a geolocation capability and provisions to access over the Internet a database of protected radio services and the locations and channels that may be used by the unlicensed devices at each location," (Item 1 on page 2 of FCC 08-260); and "Those supporting the geolocation/database approach generally state that this method would provide a means to reliably determine occupancy of TV channels by fixed services, but acknowledge that it does not provide for identifying channel occupancy by portable and/or intermittent services such as wireless microphones," (Item 60, on page 25 of FCC 08-260).

As indicated above, the FCC requires that some devices include a geolocation capability in order to determine occupancy of TV channels by fixed services. However, the FCC approach does not use a location of the device within a coverage area to determine a maximum transmission power limit and/or a maximum degradation value, as in accordance with the example embodiments of the invention.

In accordance with the example embodiments of the invention, additional available information is used to allow for more flexibility regarding the maximum WSD transmission power limits. As similarly stated above, in a first example embodiment of the invention there is provided at least a method which utilizes a database to define a maximum permitted isotropic radiated power (EIRP). The EIRP takes into account defined levels of allowed interference to primary systems for communicating by WSDs over white spaces of the spectrum. In addition, in accordance with another example embodiment of the invention, there is defined an adaptive level of location probability degradation ("C" described below). This novel adaptive level of location probability degradation is determined using parameters including, but not limited to, a density of the receivers in a given area, an accuracy level of WSD location information, and a quality of primary service coverage in a given area. Using these parameters the adaptation of power may be defined based on location specific conditions, consequently resulting in an improved and efficient use of white spaces.

In accordance with another example embodiment of the invention, there is a method providing a novel use of available parameters. For example, additional factors such as a quality of primary service coverage are taken into account when calculating a maximum permitted WSD EIRP. Furthermore, in accordance with the example embodiments of the invention, additional information is considered which makes the determinations and/or requirements for use of white space by a WSD more flexible, particularly concerning the definition of the WSD power limits. It is clear that the example embodiments of the invention can be broadly beneficial at least for the reason the embodiments of the invention may be readily implemented by database providers and also by manufactures.

Further, the example embodiments of the invention provide a geolocation database algorithm which increases flexibility regarding the maximum permitted WSD power, while avoiding harmful interference to the primary service. Location specific WSD emissions are limited by a determined level of location probability degradation, where a reference protection ratio is considered and an overloading threshold is respected. The permitted level of degradation caused by WSD emissions, based on at least the location probability, is adapted according to aspects related to a quality of the primary service coverage in the considered location, and specific characteristics of the location. Information regarding the density of primary receivers and the accuracy of the information about the WSD location can be used.

There is provided, in accordance with the example embodiments of the invention, an algorithm for a geolocation database to use adaptive degradation in location probability calculations when determining allowed radiation power for secondary users in a whitespace. More simply stated, the degradation of location probability can be made dependent on the expected signal level of the primary service. The algorithm provides more optimal channel and resource allocation in white spaces than the schemes currently required/implemented/proposed, such as required for the TV white spaces as indicated above.

Referring to FIG. 1 the geolocation database 1 can store, display and/or provide at least the following information:

Primary service median field strength for every location within an operating area, the granularity of which is defined by the regulatory bodies;

maximum permitted degradation in every location within the operating area; and reference values of protection ratio and overloading thresholds, and reference spatial geometries concerning the WSD transmitter and the primary service receiver for each type of registered WSD 2.

The negotiation of a white space channel begins with a requisition of a WSD which may inform the database 1 of at least one of:

current location of the WSD 2;

location accuracy; and type of WSD 2.

The database 1 responds with a list of available channels and the corresponding maximum EIRPs. This situation is illustrated in FIG. 1, where the geolocation database 1 and the WSD 2 can be interconnected via a network such as the internet 3.

At least one algorithm performed at the geolocation database may be summarized to include functionalities as described below:

1. Map the location information received from the WSD 2 into an area in the database 1 and a value of $E_{wmed}$;
2. combine the type of WSD with the value of $E_{wmed}$ to select the appropriate curve of location probability as a function of $E_{imed}$
3. define an adaptive degradation in the location probability of a primary service;
4. choose a reference spatial geometry between a WSD and a primary service receiver;
5. calculate the maximum permitted WSD EIRP for the reference geometry; and
6. send to the WSD 2 a list of available channels and their respective maximum permitted EIRPs.

It is noted that these functionalities are not limiting and may be performed in any order. In addition, in accordance with the example embodiments of the invention, one or more of these functionalities may be combined or omitted.

Figure 2:
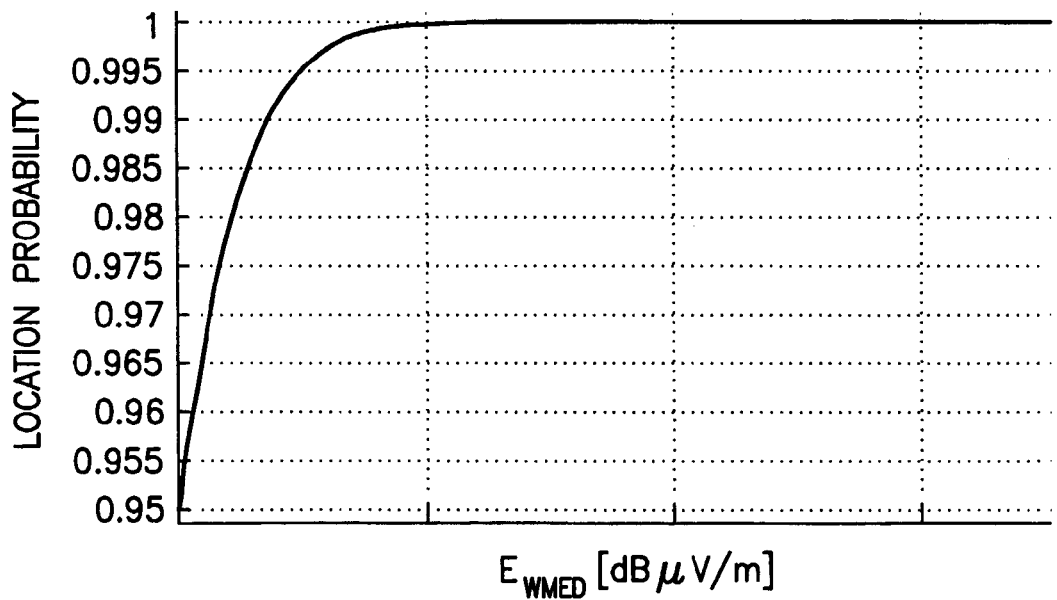
FIG. 2 shows a graph illustrating a variation of location probability with a value of $E_{wmed}$, which is the received median field strength of the wanted broadcasting signal.

Another example embodiment of the invention provides at least a method to adapt the level of degradation on the location probability of the primary service according to thresholds selected by the database. A method in accordance with the example embodiments of the invention, may comprise one or more of the following operations:

A: Mapping, at the database, the location information received from the WSD into an area of the database. This information in the database may be used to visually display a location identified by the information, such as on a map. This area of the database including the location information has an associated value of $E_{wmed}$, obtained from primary service planning. This value is related to the location probability without WSD interference (FIG. 2). At the coverage edge, the location probability is, in general, 95% for a reference value of received median field strength $E_{wmed=ref}$. As the distance from the primary service receiver to the primary service transmitter decreases, the value of location probability increases, since the $E_{wmed}$ increases.

Figure 3:
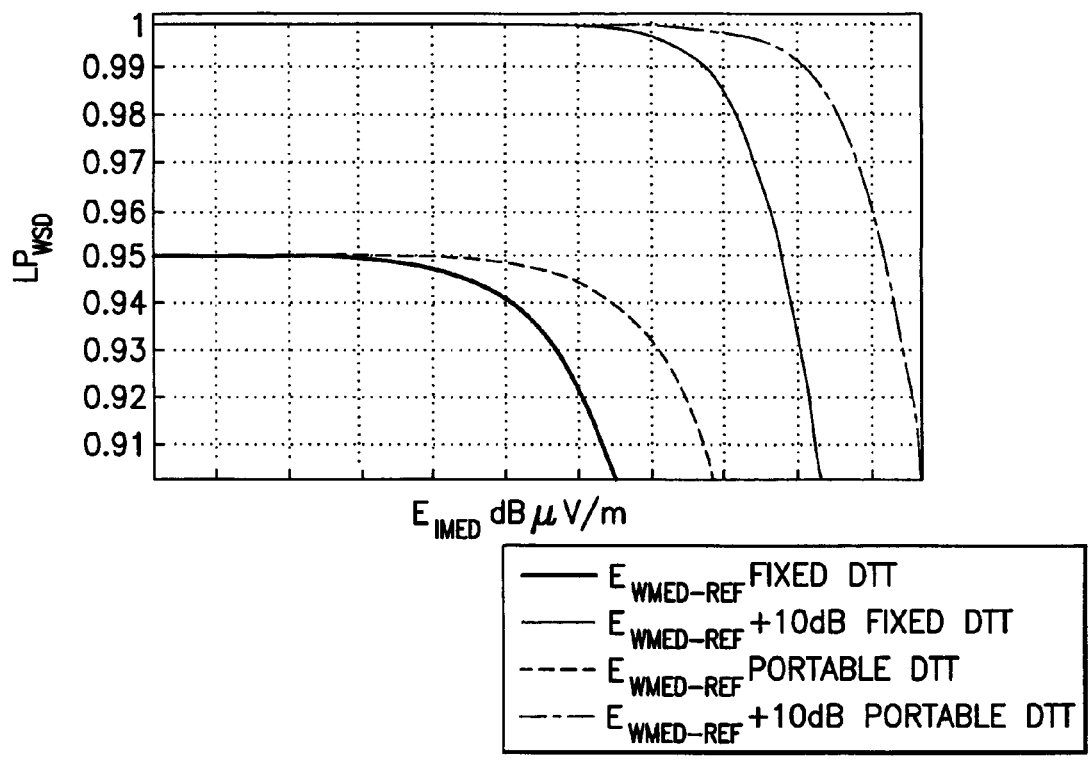
FIG. 3 shows a graph illustrating the location probability in the presence of interference, $LP_{WSD}$, with a value of $E_{imed}$, which is the received median field strength of the interference.
Figure 4:
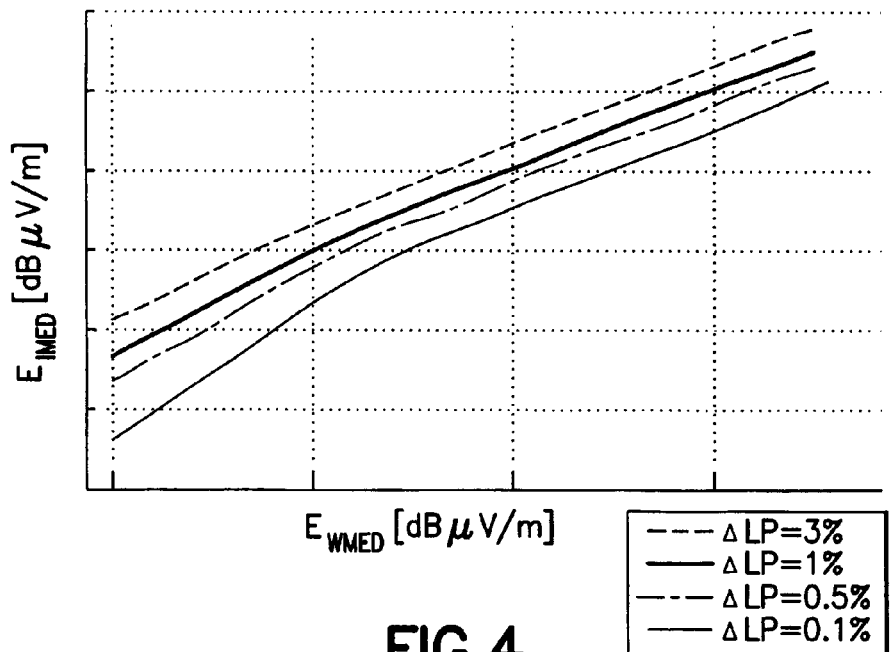
FIG. 4 shows a graph illustrating $E_{imed}$, the maximum permitted field strength of the interfering signal, as a function of $E_{med}$ for a given degradation in location probability, $\Delta LP$.

B: The database combines the information about the WSD type with the value of $E_{wmed}$ to select appropriate curves of location probability degradation as a function of the interference field strength $E_{imed}$. Each type of WSD has a different curve of location probability as a function of $E_{imed}$ because of the different values of protection ratio. Examples of curves of location probability as a function of the interference field strength and the different values of $E_{wmed}$ are shown in FIG. 3, considering two types of primary service receiver. As the value of $E_{imed}$ increases, the degradation in location probability also increases. The maximum permitted degradation may be defined by regulatory bodies, but may vary according to location specific aspects such as the quality of the primary service coverage and the density of potential primary service receiver victims. FIG. 4 shows the curves of $E_{imed}$ as a function of the $E_{wmed}$ for different levels of location probability degradation.

C: An operation makes a selection of the maximum degradation that can be caused to the primary service in a given area. There are some parameters that could be considered by the database to choose the maximum degradation permitted in the primary service. The method implemented to select an adaptive degradation in location probability is presented in the following. Two implementation improvements are also described below. It is noted that also these operations are not limiting and may be performed in any order. In addition, in accordance with the example embodiments of the invention, any one or more of these operations may be combined with another operation or omitted.

Figure 5:
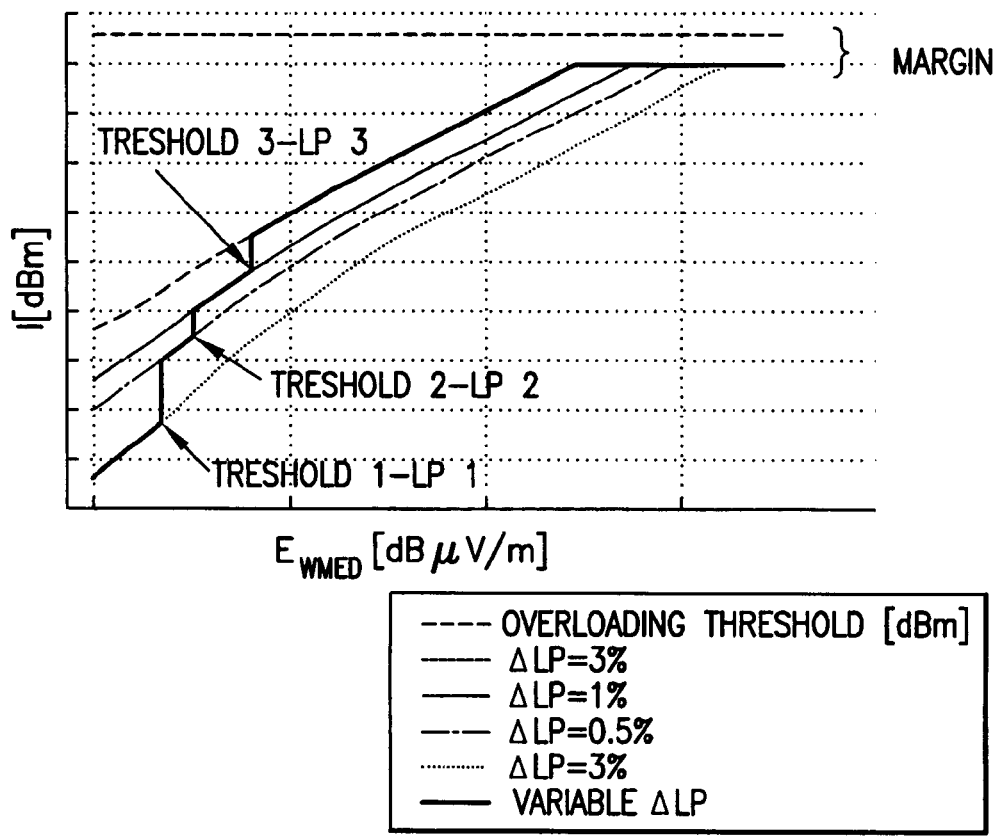
FIG. 5 shows a graph illustrating a maximum allowed interference as a function of $E_{wmed}$, $\Delta LP$ and the overloading threshold.

The database 1 defines the location probability degradation according to the $E_{wmed}$ for the location provided by the WSD 2. As each value of $E_{wmed}$ is associated to a value of location probability, the database can define thresholds of degradation according to the original location probability. The idea is to vary the degradation of location probability ΔLP with the quality of the primary service coverage in a given area. For example, a degradation of 1% may be too severe at the edge of the coverage area, where the location probability is about 95%. However, the same degradation may not be excessive in areas where the $E_{wmed}$ ensures a location probability nearer 100%. FIG. 5 illustrates a graph which shows the situation where 3 location probability thresholds 1, 2 and 3 are defined to trigger the variation of the acceptable degradation of location probability. The variation of the acceptable interference is always limited by a reference value of overloading threshold and a margin over the threshold to be selected at the database, as well as the maximum acceptable degradation defined by regulatory bodies.

Figure 6:
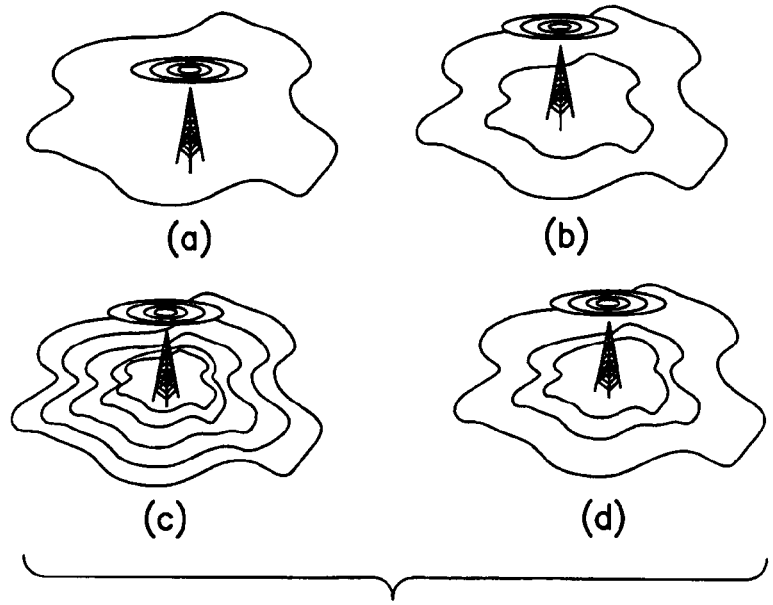
FIG. 6 shows a graph illustrating examples of the selection of different thresholds.

FIG. 6 shows four examples of possible thresholds to be used by the database. FIG. 6 (a) illustrates the example where the database uses a unique level of location probability degradation in all locations within the coverage area of a primary service transmitter. FIG. 6 (b) illustrates the situation where one threshold is defined. FIG. 6 (c) illustrates the composition of multiple thresholds selected according to the value of $E_{wmed}$, and FIG. 6 (d) illustrates an example of continuous or gradual variation of ΔLP, from the lower degradation at the coverage edge to the maximum permitted value of degradation close to the primary service transmitter.

Further, in accordance with the example embodiments of the invention, there are variations and enhancements to the operations, as described above, including:

Implementation Improvement 1:

In accordance with an example embodiment of the invention, the accuracy of the location estimate provided by the WSD to the database can be considered as an additional parameter to select the thresholds that toggle the variation of the location probability degradation. If the WSD is able to determine its location with high accuracy, the database may permit a higher degradation in the primary service, since the estimate of the interference to be caused to the primary service is more accurate. On the other hand, devices that are not capable of determining their location with high accuracy may have their maximum permitted EIRP limited by low values of location probability degradation.

Implementation Improvement 2:

In accordance with an example embodiment of the invention, environmental characteristics to define the thresholds of location probability degradation are considered. If the environment is classified as urban, suburban or rural, different levels of degradation on the location probability can be used for each region. Other information that can be explored is the density of primary service receivers in a given area. In locations characterized by a low density of primary service receivers, a higher degradation in the location probability is acceptable.

Further, in accordance with the example embodiments, these improvements can be applied individually or in combination.

At least the above described example implementations increase the flexibility regarding the determination of a maximum permitted WSD EIRP, while ensuring the protection of the TV broadcasting service.

Further, in accordance with the example embodiments of the invention, there may be additional novel operations which are described below as:

D: This operation defines reference geometries between the interfering WSD and the primary service receiver to calculate the maximum permitted WSD EIRP.

E: The database 1 calculates the value of the maximum permitted WSD EIRP from the value of the maximum permitted interference at the primary service receiver and the total loss between the WSD transmitter and the primary service receiver at the reference geometry.

F: The database 1 sends the information about the channel and maximum EIRP to the WSD 2.

The example embodiments of the invention, as described above, may provide one or more of the following advantages:

The method does not increase the complexity of the geolocation database 1; nor does it create or require any other entity in the network.

The solution uses the methodology described by at least the CEPT for the calculation of location based EIRP. Thus, at least some of the information necessary to implement the embodiments of the invention may be present at the geolocation databases.

The method, in accordance with the example embodiments, can be performed in a way that is transparent to white space devices in a network.

The method, in accordance with the example embodiments, increases the flexibility in the selection of the maximum permitted WSD EIRP, while protecting the primary service service where it is more vulnerable, for example around the primary service coverage edge.

Figure 7:
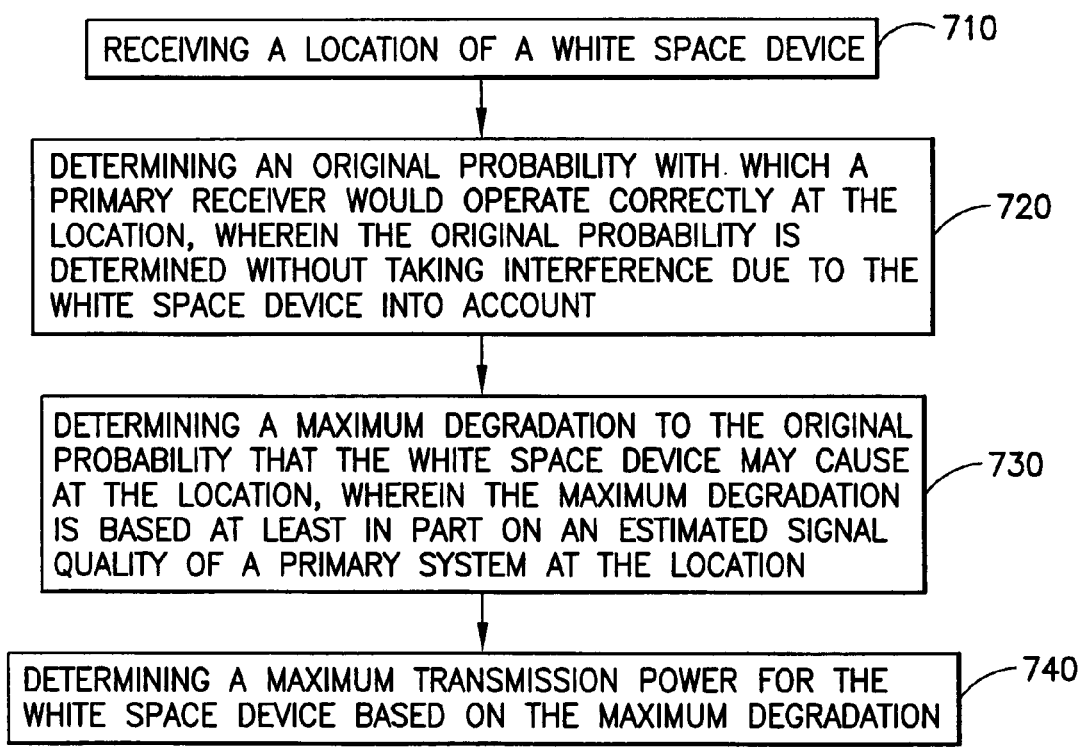
FIG. 7 is a logic flow diagrams illustrating the operation of a method, and a result of execution of computer program instructions embodied on a computer readable memory, for practicing example embodiments of this invention.

FIG. 7 is a block diagram which describes an example embodiment of the invention. The operations of FIG. 7 can be seen to be from a perspective of the network access node/eNB, or the perspective of another higher node such as may be in a network node associated with a service provider and/or manufacturer, as detailed for various embodiments of the invention. According to these example embodiments as disclosed herein, at block 710 the network node/eNB (or one or more components thereof) is receiving a location of a white space device. Then at block 720 there is determining an original probability with which a primary receiver would operate correctly at the location, wherein the original probability is determined without taking interference due to the white space device into account. Further, at block 730 there is determining a maximum degradation to the original probability that the white space device may cause at the location, wherein the maximum degradation is based at least in part on an estimated signal quality of a primary system at the location. Additionally, at block 740 there is determining a maximum transmission power for the white space device based on the maximum degradation.

In accordance with the paragraphs above, the estimated signal quality is determined based at least partly on the original probability.

Further, in accordance with the paragraphs above, the maximum transmission power is a maximum equivalent isotropic radiated power.

In addition, in accordance with the paragraphs above, the maximum degradation is based on the accuracy of the location of the white space device.

Further, in accordance with the example embodiments as described in the paragraphs above, the determining the maximum degradation is based in part on an original location probability degradation value such that the maximum degradation level is higher when the original location probability degradation value is higher.

Additionally, in accordance with the example embodiments as described in the paragraphs above, the maximum degradation is based on at least one of a determined and estimated density of primary receivers within a determined neighborhood of the location.

In addition, in accordance with the paragraph above, the estimated density of primary receivers is based on a region classification of the location.

Further, in accordance with the paragraph above, wherein the region classification is one of urban, suburban, and rural.

Figure 8:
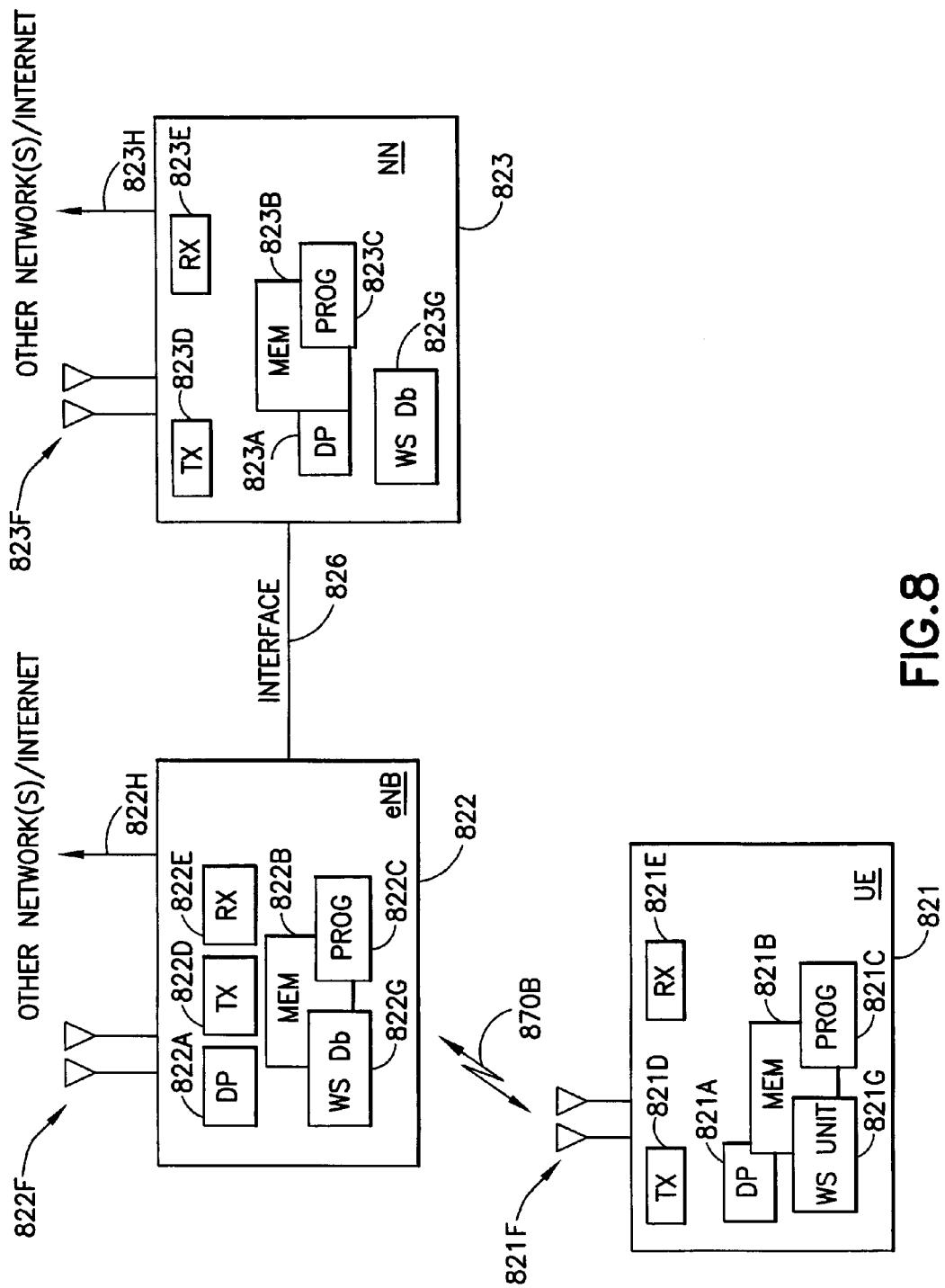
FIG. 8 a simplified block diagram of various electronic devices that are suitable for use in practicing the example embodiments of this invention.

Reference is now made to FIG. 8 for illustrating a simplified block diagram of various electronic devices and apparatus that are suitable for use in practicing the example embodiments of this invention. In FIG. 8 there is a first network access node/eNB 822 coupled via an interface 826 to a network node/NN 823, of which the former is shown as adapted for communication over wireless link 870B with apparatus UE 821, such as a mobile terminal or termed more generally user equipment (UE). Either the network nodes eNB 822 or NN 823 can comprise a geolocation database 822G and 823G, respectively, for use in performing WS allocation, as in accordance with the example embodiments of the invention. As stated above, the eNB 822 and the NN 823 may be communicatively coupled via an interface 826 to a primary network. Interface 826 can be for wireless communication via antennas 822F and 823F of the eNB 822 and the NN 823, respectively. Further, in a non-limiting embodiment the eNB 822 and the NN 823 may be coupled using interfaces 822H and 823H, respectively, which are coupled to further networks (e.g., PSTN and/or a data communications network/Internet). The NN 823 can be another network device or a higher network node. In addition, the NN 823 can be located in a service provider or manufacturer network.

The UE 821 includes processing means such as at least one data processor 821A, storing means such as at least one computer-readable memory 821B storing at least one computer program 821C, communicating means such as a transmitter TX 821D and a receiver RX 821E for bidirectional wireless communications 870B with the eNB 822 via one or more antennas 821F. In a non-limiting embodiment, connected to at least the memory 821B and the DP 821A of the UE 821 is a WS unit 821G. The UE 821 may operate the WS 821G to at least process a WS assignment, such as to process a list of available WS channels and their respective maximum permitted EIRPs, as in accordance with the example embodiments of the invention.

The network node or eNB 822 also includes processing means such as at least one data processor 822A, storing means such as at least one computer-readable memory 822B storing at least one computer program 822C, and communicating means such as a transmitter TX 822D and a receiver RX 822E for bidirectional wireless communications 870B, such as with its associated UE 821, via one or more antennas 822F. The eNB 822 also has stored in its memory the WS Db 822G which can be configured to perform at least determinations and WS assignments, as in accordance with the example embodiments of the invention.

Electronic devices implementing various aspects of the invention need not be the entire UE 821 or network nodes 822 and 823, but example embodiments may be implemented by one or more components of same such as the above described tangibly stored software, hardware, firmware and DP, or a system on a chip SOC or an application specific integrated circuit ASIC or a digital signal processor DSP or a modem or a subscriber identity module commonly referred to as a SIM card.

Various embodiments of the UE 821 can include, but are not limited to: cellular telephones; data cards, USB dongles, personal portable digital devices having wireless communication capabilities including but not limited to laptop/palmtop/tablet computers, digital cameras and music devices, e-readers and Internet appliances. Other embodiments of the described UE 821 may be implemented as a M2M device which may not have a user interface directly but instead be remotely disposed for user-free operation.

Various embodiments of the computer readable MEM 821B, 822B and 823B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 821A, 822A and 823A include but are not limited to general purpose computers, special purpose computers, microprocessors, digital signal processors (DSPs) and multi-core processors.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
   receiving a location of a white space device;
   determining an original probability with which a primary receiver would operate correctly at the location, wherein the original probability is determined without taking interference due to the white space device into account;
   determining a maximum degradation to the original probability that the white space device may cause at the location, wherein the maximum degradation is based at least in part on an estimated signal quality of a primary system at the location; and
   determining a maximum transmission power for the white space device based on the maximum degradation.

2. The method according to claim 1, wherein the estimated signal quality is determined based at least partly on the original probability.

3. The method according to claim 1, wherein the maximum transmission power is a maximum equivalent isotropic radiated power.

4. The method according to claim 1, wherein the maximum degradation is based on an accuracy of the location of the white space device.

5. The method according to claim 1, wherein the determining the maximum degradation is based in part on an original location probability degradation value such that the maximum degradation level is higher when the original location probability degradation value is higher.

6. The method according to claim 1, wherein the maximum degradation is based on at least one of a determined and an estimated density of primary receivers within a determined neighborhood of the location.

7. The method according to claim 6, wherein the estimated density of primary receivers is based on a region classification of the location.

8. The method according to claim 7, wherein the region classification is one of urban, suburban, and rural.

9. A non-transitory computer readable medium encoded with a computer program executable by a processor to perform the following actions
   receiving a location of a white space device;
   determining an original probability with which a primary receiver would operate correctly at the location, wherein the original probability is determined without taking interference due to the white space device into account;
   determining a maximum degradation to the original probability that the white space device may cause at the location, wherein the maximum degradation is based at least in part on an estimated signal quality of a primary system at the location; and
   determining a maximum transmission power for the white space device based on the maximum degradation.

10. An apparatus comprising:
    at least one processor; and
    at least one memory including computer program code, where the at least one memory and the computer program code are configured, with the at least one processor, to cause the apparatus to at least:
    receive a location of a white space device;
    determine an original probability with which a primary receiver would operate correctly at the location, wherein the original probability is determined without taking interference due to the white space device into account;
    determine a maximum degradation to the original probability that the white space device may cause at the location, wherein the maximum degradation is based at least in part on an estimated signal quality of a primary system at the location; and
    determine a maximum transmission power for the white space device based on the maximum degradation.

11. The apparatus according to claim 10, wherein the estimated signal quality is determined based at least partly on the original probability.

12. The apparatus according to claim 10, wherein the maximum transmission power is a maximum equivalent isotropic radiated power.

13. The apparatus according to claim 10, wherein the maximum degradation is based on an accuracy of the location of the white space device.

14. The apparatus according to claim 10, wherein the at least one memory including the computer code is configured, with the at least one processor, to cause the apparatus to determine the maximum degradation based in part on an original location probability degradation value such that the maximum degradation level is higher when the original location probability degradation value is higher.

15. The apparatus according to claim 10, wherein the maximum degradation is based on at least one of a determined and an estimated density of primary receivers within a determined neighborhood of the location.

16. The apparatus according to claim 15, wherein the estimated density of primary receivers is based on a region classification of the location.

17. The apparatus according to claim 16, wherein the region classification is one of urban, suburban, and rural.

18. An apparatus comprising:
    means for receiving a location of a white space device;
    means for determining an original probability with which a primary receiver would operate correctly at the location, wherein the original probability is determined without taking interference due to the white space device into account;
    means for determining a maximum degradation to the original probability that the white space device may cause at the location, wherein the maximum degradation is based at least in part on an estimated signal quality of a primary system at the location; and
    means for determining a maximum transmission power for the white space device, based on the maximum degradation.

19. The apparatus according to claim 18, wherein the means for receiving comprises an interface to a wireless communications network, and wherein the means for determining comprises computer program code, embodied on at least one non-transitory memory, executed by at least one processor.

* * * * *